June 16, 1942.     A. C. SCHANZ     2,286,980
SWINGING MULTIPLE SPOT WELDING ELECTRODE
Filed Feb. 7, 1941     3 Sheets-Sheet 1

INVENTOR
*Arthur C. Schanz*
BY
*Donald U. Rich*
ATTORNEY

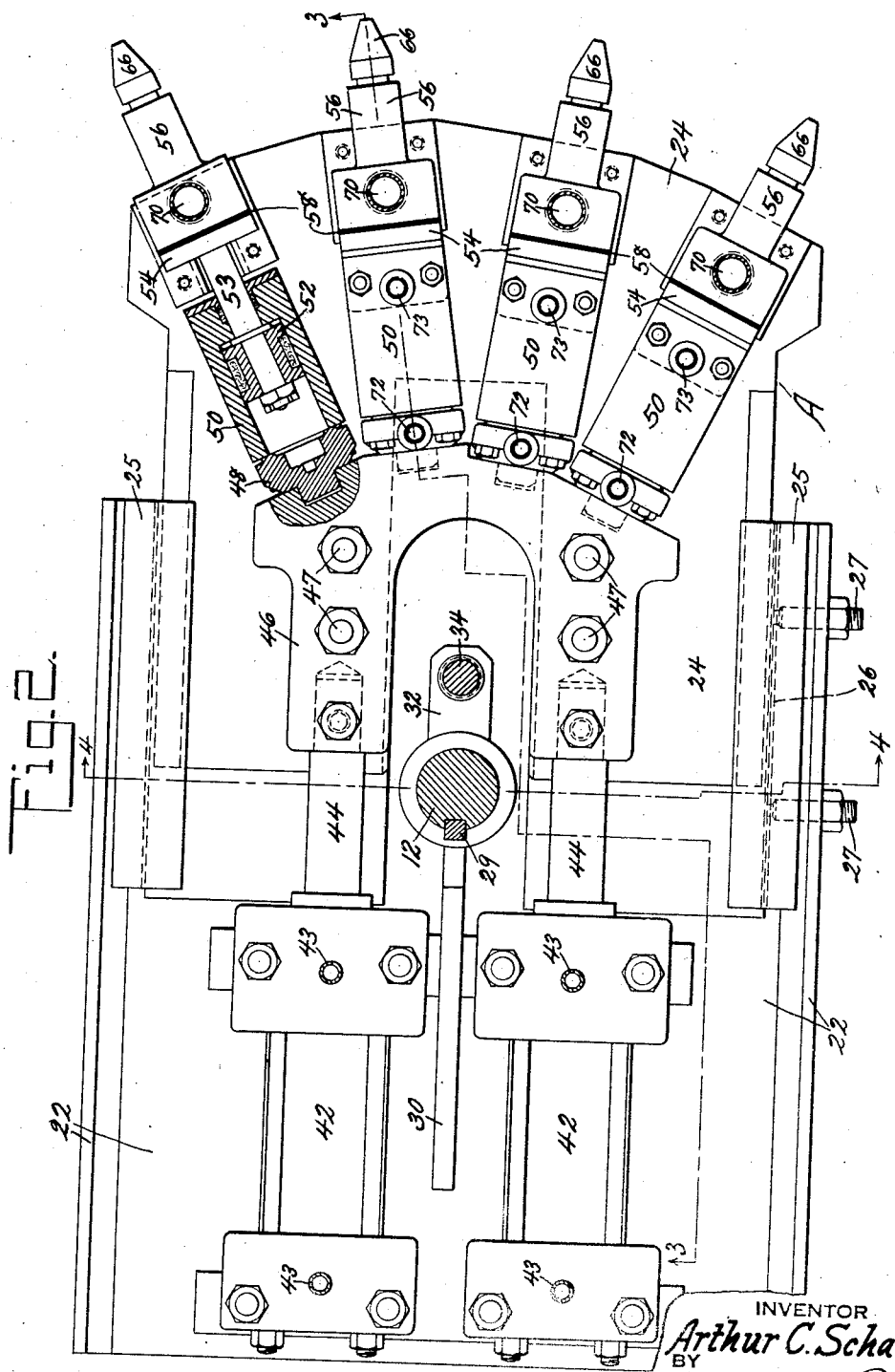

June 16, 1942.   A. C. SCHANZ   2,286,980
SWINGING MULTIPLE SPOT WELDING ELECTRODE
Filed Feb. 7, 1941   3 Sheets-Sheet 3
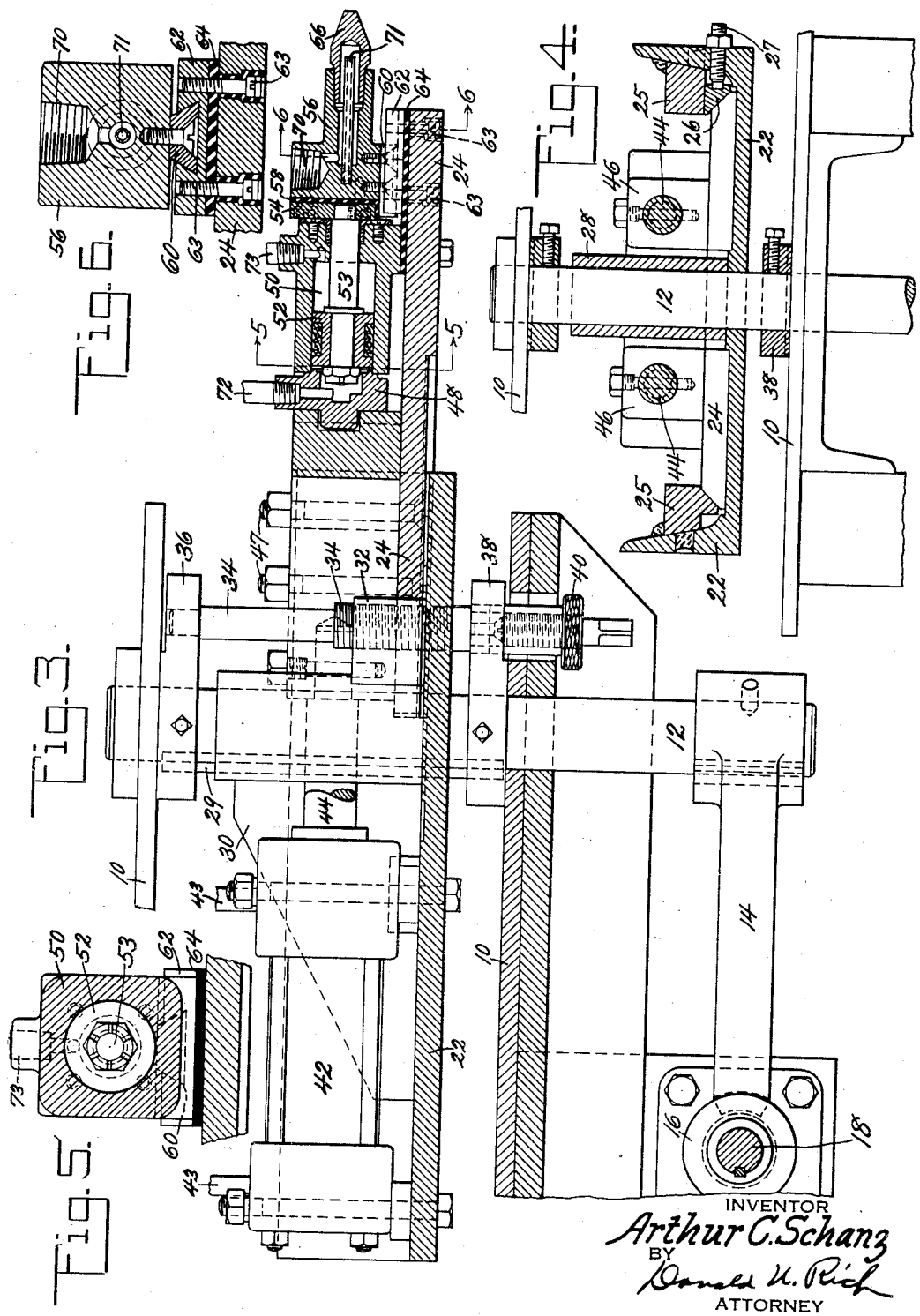
INVENTOR
Arthur C. Schanz
BY
ATTORNEY Patented June 16, 1942

2,286,980

UNITED STATES PATENT OFFICE 2,286,980

SWINGING MULTIPLE SPOT WELDING ELECTRODE

Arthur C. Schanz, Glen Ridge, N. J., assignor to American Car and Foundry Company, New York, N. Y., a corporation of New Jersey Application February 7, 1941, Serial No. 377,911

11 Claims. (Cl. 219—4)

This invention relates in general to spot welding electrodes and in particular to swinging multiple electrodes for spot welding curved members.

In the past whenever curved pieces have been fastened together single spot welding or plier type welders have been used to join the curved members together. The use of plier or single welders is, of course, slow and tedious. It is an object, therefore, of the present invention to provide a swinging multiple electrode whereby a plurality of spots may be made simultaneously on curved members.

A further object of the invention is the provision of a swinging multiple tip electrode for spot welding curved members and in which the individual electrodes are independently movable to conform to variations in curvature.

A still further object of the invention is the provision of a swinging multiple tip electrode in which all electrodes may be moved either simultaneously toward the work or individually toward the work and wholly independent of the swinging of the electrode.

These and other objects of the invention will be apparent to persons skilled in the art from a study of the following description and accompanying drawings, in which:

Fig. 2 is an enlarged view of one of the multiple tip electrodes;

Fig. 3 is a sectional view taken substantially on line 3—3 of Fig. 2;

Fig. 4 is a sectional view taken substantially on line 4—4 of Fig. 2, and

Figure 1:
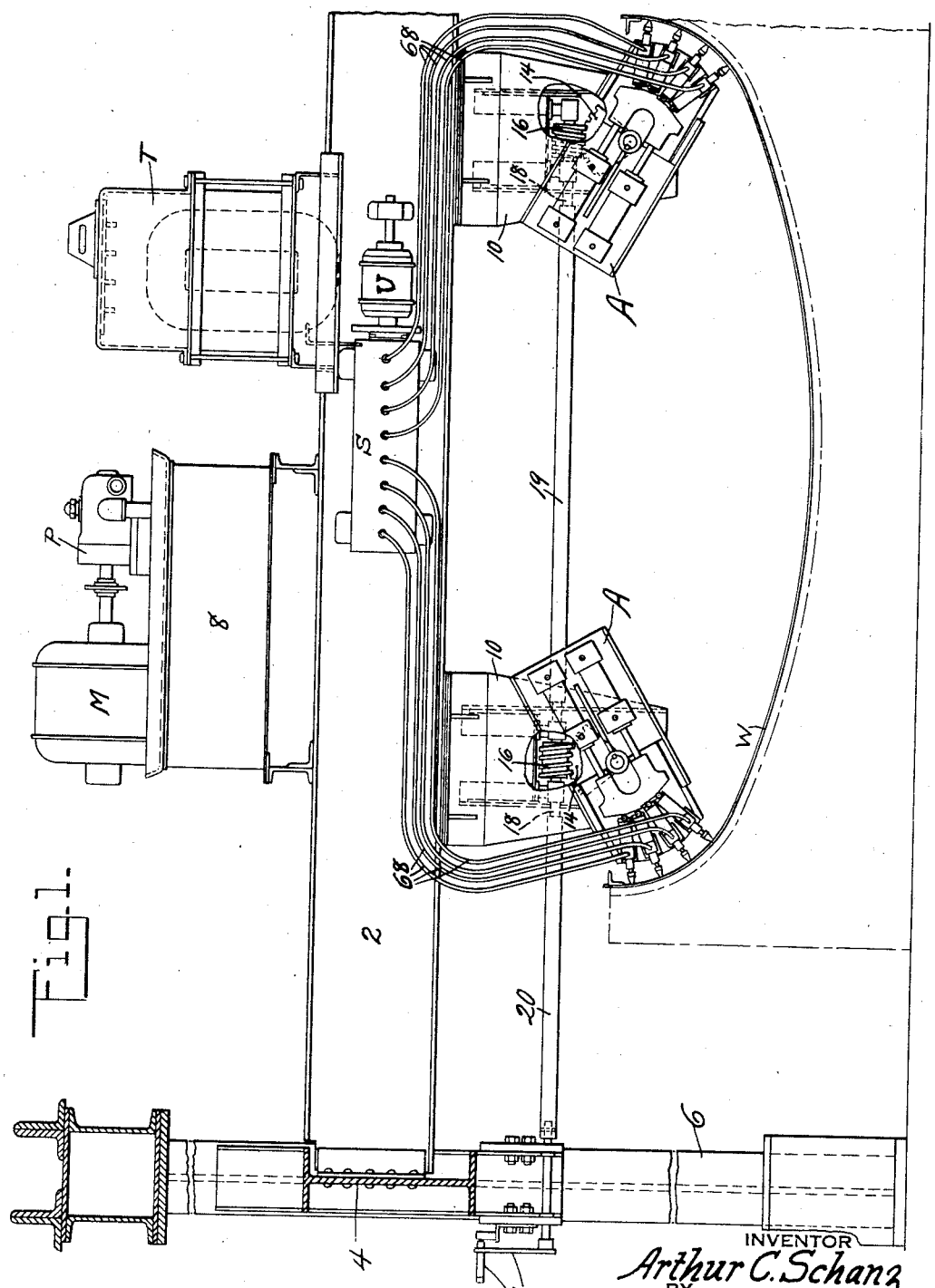
Figure 1 is an elevational view of a portion of a spot welding machine with the swinging multiple tip electrodes carried thereby.

Figs. 5 and 6 are sectional views taken respectively on lines 5—5 and 6—6 of Fig. 3.

Referring now to the drawings in detail, it will be seen that each multiple tip electrode A is carried by a beam 2 forming part of the machine and connecting beams 4 which are vertically slidable with respect to the machine frame 6. The beam 2, as clearly shown in Fig. 1, carries a tank 8 adapted to contain oil or other fluid which may be pumped by a force pump P driven by a motor M. The beam also carries a transformer T, the secondary of which is indicated in dotted lines and is connected to a switch box S carried by beam 2 and driven by a motor U.

As clearly shown in Figs. 1 and 3, heavy spaced plates 10 are connected to beam 2 and are provided adjacent their lower ends with openings to receive pivot rods 12. These pivot rods have connected thereto at one end a worm gear segment 14 adapted to be driven by a worm 16 keyed or otherwise non-rotatably secured on a shaft 18 journaled for rotation in brackets carried by the supporting brackets or plates 10. The shafts 18 are connected together by connecting shaft 19 and are driven by shaft 20 connected to a hand crank 21. The worms, as clearly shown in Fig. 1, are provided with right and left hand threads in order that rotation of the shafts 18 will cause the multiple tip electrodes to swing toward or away from each other simultaneously, dependent upon the direction of rotation of the crank 21.

Each of the multiple tip electrode holders comprises a cylinder support and guide member 22 which, as clearly shown in Fig. 4, may be made from a commercial channel with parts machined away to receive slide plate 24. Slideways 25 are welded or otherwise secured to the flanges of the channel member and at least one of these ways is provided with an adjustable portion 26 movable inward or outward by means of adjusting screws 27. Each cylinder support and guide member has welded or otherwise secured thereto a pipe or other tubular projection 28 provided with a keyway by means of which the member may be non-rotatably keyed as at 29 to pivot shaft 12 (Figs. 2 and 3). To one side of the tubular projection is welded a bracing gusset 30, while to the other side is welded or otherwise secured a block 32 having an internally threaded opening therethrough adapted to have threaded engagement with an adjusting screw 34. This adjusting screw has a reduced end rotatably mounted in an extension of thrust bearing member 36 non-rotatably secured to pivot rod 12. An intermediate portion of the adjusting rod is rotatably mounted in a second thrust bearing 38, likewise non-rotatably secured to the pivot rod and backed up by the supporting bracket plates 10 which plates have an arcuate opening cut therein to permit passage therethrough of a threaded end of adjusting screw 34. This extended threaded end is provided with a knurled locking nut 40 by means of which the adjusting screw 34 may be locked in position. It will be seen that rotation of adjusting screw 34 will through block 32 cause a sliding of the entire cylinder supporting and guide member axially along pivot rod 12, although any rotative motion between the member and pivot rod will be prevented by key 29. In other words, the relative position of the cylinder support and guide member between spaced brackets 10 may be controlled by rotation of adjusting screw 34. Rigidly mounted upon the cylinder support and guide member on either side of gusset 30 are electrode shifting cylinders 42 supplied with fluid under pressure through connections 43. Each cylinder is provided with a piston, not shown, acting upon a piston rod 44 connected at its outer end to the leg of a U-shaped plate 46 clamped by means of countersunk head bolts 47 to slide plate 24. Thus it will be seen that actuation of piston rods 44 will cause the entire slide plate 24 to move toward or away from the cylinders 42; in other words, toward or away from the pivot rod 12.

The outer face of the U-shape member 46 is provided with a plurality of recesses, in the present instance 4, adapted to receive projections on cylinder heads 48 to position the same. Each of the cylinder heads is sealed relative to its cylinder 50, within which works a piston 52 connected to a piston rod 53, which in turn is connected at its outer end to a plate 54 (Fig. 3). This plate has secured thereto an electrode tip holder 56 thoroughly insulated from plate 54 by insulation 58 which not only is interposed between the plate and tip holder, but also completely surrounds and insulates the fastening bolts from the respective members in much the same way as do the similar fasteners shown in Fig. 6. Each electrode holder has fastened thereto a slide 60 (Fig. 6) adapted to slide in ways 62, fastened to slide plate 24 by means of fasteners 63 completely insulated from slide plate 24; likewise ways 62 are insulated from slide plate 24 by a strip of insulation 64. Thus it will be seen that actuation of piston rod 53 will cause sliding movement of electrode holder 56 toward or away from the cylinder; in other words, relative to the slide plate 24. Each electrode holder is provided with an electrode tip 66 adapted to be cooled by fluid fed in through a combined conductor and fluid cable 68 (Fig. 1) fastened to the electrode holder in opening 70 (Fig. 3). Heated waste water from the tip is conducted therefrom by a pipe 71 to an overflow tube, not shown. Fluid under pressure is fed to cylinders 50 through pipe connections 72 and 73 fastened respectively to the cylinder head and cylinder body. These pipes, as well as pipes or connections 43, are preferably supplied with fluid from pump P by connections, not shown, through control valves permitting operation of piston rods 44 in unison but independently of the operation of piston rods 53 connected to each electrode holder. The combined current and fluid conductor cables 68 are connected to the electrode holders, as stated, at one end and at the other end to segments to switch S and adapted to be sequentially connected to the secondary of transformer T through movement of a roller or other means in the switch and driven by motor U.

As clearly shown in Fig. 1, the swinging electrodes are in position to operate upon the curved portion of a roof structure such as used in railway passenger cars, which roof structure is supported upon and backed up by a copper surfaced jig supported upon the machine foundation and electrically connected to the transformer secondary. As clearly shown in this figure, rotation of crank 21 will cause electrode holders A to swing either toward or away from each other, thus regulating the position at which the electrode tips will contact the work W, in this case the railway car roof. In a machine as constructed the electrode tips are spaced approximately six inches apart when in extended position and the worm gearing is so designed that one rotation of the crank 21 will cause a swinging of the tip through a distance of approximately 1¼ inches, thus by three rotations of the crank a continuous series of spots approximately 1¼ inches apart may be made on the sharply curved portion of the roof, after which the swinging electrodes may be swung to a second position, if necessary, and a second series of spots made upon the roof.

From the preceding description it will be seen that since beam 2 can rise and fall relative to the work, pivot pin 12 will likewise rise and fall relative to the work together with the entire swinging electrode assembly; actuation of crank 21 will cause simultaneous swinging of the electrode carriers relative to the supporting structure and hence relative to the work and in a direction transverse of the work. Application of fluid pressure from pump P, or some other source, through cylinders 42 will cause movement of the entire electrode group toward or away from the work, while application of fluid pressure to cylinders 50 will cause movement of the electrodes relative to the slide plates and toward or away from the work. Due to this flexibility of control a considerable variation in curvature may be permitted in members to be welded; that is, by swinging the assemblies about the axis of pivot 12 the electrodes may be so positioned as to bring the center of pressure in line with this axis, thereby eliminating as much as possible any eccentric loading on the assembly. Projection of the electrode holders as a group by means of cylinders 42 will permit their entrance into spaces otherwise unavailable by a mere downward movement of the entire assembly attached to beam 2. The projection of electrodes individually relative to the assembly also increases the depth to which the electrode tips may be moved in reaching otherwise inaccessible portions of the work. It will also be seen that by individual actuation of the electrode tip an equalization takes place since they are all connected to some remote single source of pressure and each electrode may seek its own position upon the work, thus again permitting considerable variation in the contour of the work to be welded.

While the swinging electrodes and their control have been described more or less in detail, it will be obvious to persons skilled in the art that various changes may be made and all such changes are contemplated as will fall within the scope of the appended claims defining my invention.

What is claimed is:

1. A multiple tip electrode for spot welding machines comprising a plurality of work engaging tips arranged substantially in a single plane extending substantially through the longitudinal axis of the tips, means for simultaneously moving said tips toward and away from engagement with the work, additional means for independently moving said tips into and out of engagement with the work, and means for bodily swinging said tips relative to the work and in the plane through the tips.

2. A multiple tip electrode for spot welding machines comprising a plurality of work engaging tips arranged substantially in a single plane extending substantially through the longitudinal axis of the tips, means for swinging said tips relative to the work in the plane through the tips, means for simultaneously projecting all of said tips toward the work, and additional means independently projecting said tips into engagement with the work whereby all tips will bear equally on the work thereby obviating an exact setting of said first named means.

3. A multiple tip electrode for spot welding machines comprising a plurality of work engaging tips arranged substantially in a single plane extending substantially through the longitudinal axis of the tips, means for swinging said tips relative to the work in the plane through the tips, means for simultaneously projecting all of said tips toward the work, and additional means for independently projecting preselected tips into engagement with the work and with equal pressure whereby an exact setting of said first named means is obviated.

4. A multiple tip electrode for spot welding machines comprising in combination a vertically movable pivot rod carried by the machine, a cylinder support member mounted on said pivot rod for swinging movements relative to the machine, a slide plate carried by said member and slidable relative thereto, a cylinder fastened on said member, a piston rod slidable in said cylinder and connected to said slide plate to move the same, a plurality of work contacting tips carried by said slide plate and movable relative thereto, a plurality of cylinders fastened to said slide plate and movable therewith, pistons in said cylinders, and piston rods connected to said pistons and to said tips to move the same relative to the plate.

5. A multiple tip electrode for spot welding machines comprising in combination a vertically movable pivot rod carried by the machine, a cylinder support member mounted on said pivot rod for swinging movements relative to the machine, a slide plate carried by said member and slidable relative thereto, a cylinder fastened on said member, a piston rod slidable in said cylinder and connected to said slide plate to move the same, a plurality of work contacting tips carried by said slide plate and movable relative thereto, a plurality of cylinders fastened to said slide plate and movable therewith, pistons in said cylinders, piston rods connected to said pistons and to said tips to move the same relative to the plate, and means carried by the machine for swinging said member.

6. A multiple tip electrode for spot welding machines comprising in combination a vertically movable pivot rod carried by the machine, a cylinder support member mounted on said pivot rod for swinging movements relative to the machine, a slide plate carried by said member and slidable relative thereto, a cylinder fastened on said member, a piston rod slidable in said cylinder and connected to said slide plate to move the same, a plurality of work contacting tips carried by said slide plate and movable relative thereto, a plurality of cylinders fastened to said slide plate and movable therewith, pistons in said cylinders, piston rods connected to said pistons and to said tips to move the same relative to the plate, means carried by the machine for swinging said member, and additional means for sliding said member along said pivot rod to any preselected position.

7. A multiple tip electrode for spot welding machines comprising a plurality of work engaging tips, means for simultaneously moving said tips toward and away from engagement with the work, additional means for independently moving said tips into and out of engagement with the work, means for bodily swinging said tips relative to the work and in a plane through the tips, and adjusting means for sliding said tips relative to the work and in planes substantially perpendicular to the plane through the tips.

8. A multiple tip electrode for spot welding machines comprising a plurality of work engaging tips, means for swinging said tips relative to the work in a plane through the tips, means for projecting said tips toward the work, and means for moving said tips in a direction substantially normal to the plane in which said tips swing.

9. A multiple tip electrode for spot welding machines comprising a plurality of work engaging tips, means for swinging said tips relative to the work in a plane through the tips, means for simultaneously projecting all of said tips toward the work, additional means for independently projecting preselected tips into engagement with the work whereby an exact setting of said first named means is obviated, and shifting means for moving said tips relative to the work in a direction normal to the plane through the tips.

10. A multiple tip electrode for spot welding machines comprising in combination a pivot rod carried by the machine, a cylinder support member mounted on said pivot rod for swinging movements relative to the machine, a slide plate carried by said member and slidable relative thereto, a cylinder fastened on said member, a piston rod slidable in said cylinder and connected to said slide plate to move the same, a plurality of work contacting tips carried by said slide plate and movable relative thereto, a plurality of cylinders fastened to said slide plate and movable therewith, pistons in said cylinders, piston rods connected to said pistons and to said tips to move the same relative to the plate.

11. A multiple tip electrode for spot welding machines comprising in combination a pivot rod carried by the machine, a cylinder support member mounted on said pivot rod for swinging movements relative to the machine, a slide plate carried by said member and slidable relative thereto, a cylinder fastened on said member, a piston rod slidable in said cylinder and connected to said slide plate to move the same, a plurality of work contacting tips carried by said slide plate and movable relative thereto, a plurality of cylinders fastened to said slide plate and movable therewith, pistons in said cylinders, piston rods connected to said pistons and to said tips to move the same relative to the plate, means carried by the machine for swinging said member, and additional means for sliding said member along said pivot rod to any preselected position.

ARTHUR C. SCHANZ.